US008823745B2

(12) United States Patent
Francois et al.

(10) Patent No.: US 8,823,745 B2
(45) Date of Patent: Sep. 2, 2014

(54) IMAGE PROCESSING BASED ON DEPTH INFORMATION AND COLOR DATA OF A SCENE

(75) Inventors: Alexandre Ralph Jean Francois, Los Angeles, CA (US); John Schultz, Beverly Hills, CA (US)

(73) Assignee: Yoostar Entertainment Group, Inc., New York, NY (US)

( * ) Notice: Subject to any disclaimer, the term of this patent is extended or adjusted under 35 U.S.C. 154(b) by 477 days.

(21) Appl. No.: 13/211,115

(22) Filed: Aug. 16, 2011

(65) Prior Publication Data

US 2012/0306904 A1 Dec. 6, 2012

Related U.S. Application Data

(60) Provisional application No. 61/492,771, filed on Jun. 2, 2011.

(51) Int. Cl.
| G09G 5/00 | (2006.01) |
| H04N 9/76 | (2006.01) |
| H04N 13/00 | (2006.01) |
| H04N 5/272 | (2006.01) |
| G06T 7/00 | (2006.01) |
| A63F 13/06 | (2006.01) |

(52) U.S. Cl.
CPC ..... *G06T 7/0081* (2013.01); *G06T 2207/30196* (2013.01); *G06T 2207/20144* (2013.01); *H04N 13/0018* (2013.01); *A63F 2300/695* (2013.01); *H04N 5/272* (2013.01); *G06T 2207/10024* (2013.01); *A63F 2300/69* (2013.01); *G06T 2207/10028* (2013.01); *A63F 2300/6692* (2013.01); *G06T 7/0097* (2013.01); *A63F 13/06* (2013.01); *A63F 2300/1093* (2013.01)
USPC .......................................... 345/638; 348/598

(58) Field of Classification Search
CPC ................... G06T 2207/20144; G06T 7/0081; G06T 2207/10024; G06T 15/503; G06T 7/0083; G06T 2200/12
USPC .......................................... 345/638; 348/598
See application file for complete search history.

(56) References Cited

U.S. PATENT DOCUMENTS

| 5,995,671 | A | 11/1999 | Nagarajan et al. ............ 382/242 |
| 2003/0053670 | A1* | 3/2003 | Hauper et al. ................ 382/130 |
| 2007/0085863 | A1* | 4/2007 | Moriya et al. ................ 345/694 |
| 2008/0101696 | A1* | 5/2008 | Noh .............................. 382/168 |
| 2008/0143739 | A1* | 6/2008 | Harris et al. .................. 345/604 |
| 2009/0316009 | A1* | 12/2009 | Ito et al. ..................... 348/208.4 |
| 2010/0035682 | A1 | 2/2010 | Gentile et al. ................. 463/30 |
| 2010/0074552 | A1* | 3/2010 | Sun et al. ...................... 382/264 |
| 2011/0051206 | A1* | 3/2011 | Sitter et al. ................... 358/518 |
| 2012/0002899 | A1* | 1/2012 | Orr et al. ...................... 382/282 |

OTHER PUBLICATIONS

Real-time Foreground Segmentation via Range and Color Imaging by Ryan Crabb† 2008 IEEE pp. 1-5.*

(Continued)

*Primary Examiner* — Kee M Tung
*Assistant Examiner* — Haixia Du
(74) *Attorney, Agent, or Firm* — Fitzpatrick, Cella, Harper & Scinto

(57) ABSTRACT

Systems, apparatuses, methods, and computer program products perform image processing in an environment in which depth information and color data of a scene including a player and a background are received from a capture device, and in which an image of the player combined with video data is output.

23 Claims, 7 Drawing Sheets

(56) References Cited

OTHER PUBLICATIONS

International Search Report and Written Opinion of the International Searching Authority for International Patent Application No. PCT/US2012/036937, Sep. 10, 2012.
R. Gvili et al., "Depth Keying", Proc. of SPIE—IS&T Electronic Imaging, vol. 5006, Jan. 1, 2003, pp. 564-574.
R. Crabb et al., "Real-time Foreground Segmentation via Range and Color Imaging", Computer Vision and Pattern Recognition Workshops, CVPR Workshops 2008, IEEE Computer Society Conf., NJ, USA, Jun. 23, 2008, pp. 1-5.
B. Huhle et al., "Robust Non-Local Denoising of Colored Depth Data", Computer Vision and Pattern Recognition Workshops, CVPR Workshops 2008, IEEE Computer Society Conf., NJ, USA, Jun. 23, 2008, pp. 1-7.
I. Schiller et al., "Improved Video Segmentation by Adaptive Combination of Depth Keying and Mixture-of-Gaussians", Proc. SCIA, Springer Berlin Heidelberg, LNCS 6688, Jan. 1, 2011, pp. 59-68.
http://pixinsight.com/doc/legacy/LE/19_morphological/median_filter/median_filter.html, Pleiades Astrophoto (2004).
François, A., "Semantic, Interactive Manipulation of Visual Data", Ph.D. dissertation / IRIS Technical Report IRIS-01-409, University of Southern California, Los Angeles (Dec. 2000).
Kass, M., et al., "Snakes—Active Contour Models", International Journal of Computer Vision, 1(4): 321-331 (1987).
Mortensen, E. et al., "Intelligent scissors for image composition", In: SIGGRAPH '95: Proceedings of the 22nd annual conference on Computer graphics and interactive techniques, New York, NY, USA: ACM Press, p. 191-198 (1995).
Boykov, Y., et al.,"Interactive graph cuts for optimal boundary & region segmentation of objects in n-d images", in International Conference on Computer Vision (2001).
http://docs.gimp.org/en/gimp-layer-white-balance.html (Version 1.2, Dec. 2000).
http://fourier.eng.hmc.edu/e161/lectures/contrast_transform/node3.html (Sep. 2009).
Microsoft Research, "Kinect for Windows SDK Beta Programming Guide", pp. 1-34 (Jul. 2011).
Young, E., et al., "Image Processing & Video Algorithms With CUDA", in NVISION08 (2008).

* cited by examiner

IMAGE PROCESSING BASED ON DEPTH INFORMATION AND COLOR DATA OF A SCENE

CROSS-REFERENCE TO RELATED APPLICATION

The present application claims priority to U.S. Provisional Application No. 61/492,771, filed on Jun. 2, 2011, the entire contents of which are hereby incorporated by reference as if set forth fully herein.

BACKGROUND

1. Field

Example aspects of the present invention generally relate to image processing, and more particularly to image processing for captured data of a scene.

2. Related Art

In gaming and other entertainment environments, it is common for user to interact with a video display, in order to cause output on the video display. For example, a user may press buttons on a controller to cause a character on the screen to move in a certain manner.

Some gaming systems have attempted to incorporate more realistic motion capture of the live player in an effort to further involve the player in the game. For example, a controller may capture motion of a user's arm, and reflect that motion on the screen.

BRIEF DESCRIPTION

Recent developments allow for capture of an image and movements of a live player without use of a separate device held by the player. In particular, a capture device can capture color data and depth information indicating the position of a live player in three-dimensional space and combine such data with other content, so as to depict the live player as part of output video data. For example, a live action image of a player could be placed "inside" of a movie scene. Nevertheless, technical challenges in this process include defects such as noise, artifacts and temporal and spatial discontinuities, which can lead to a reduced quality image of the player in the output video.

The example embodiments described herein address the foregoing by providing systems, apparatuses, methods, and computer program products for performing image processing, in an environment in which depth information and color data of a scene including a player are received from a capture device, and in which an output image of the player is combined with video data.

One example aspect provides systems, apparatuses, methods, and computer program products in which depth information of a scene and color data of the scene are received from a capture device. The scene includes a player and a background. A noise reduction filter is applied to the color data, and an image of the player is output using the color data and depth information. The image of the player is combined with video data.

Another example aspect provides systems, apparatuses, methods, and computer program products in which depth information of a scene and color data of the scene are received from a capture device. The scene includes a player and a background. A background model of the scene is constructed by performing, for each pixel, steps of storing the position of the pixel as p and the color components of the pixel as r, g, b, initializing a model pixel at the same position p with color component distribution G(mr, sr), G(mg, sg), G(mb, sb), initializing a variable "a" as an update weight, and updating the values of the model pixel according to the process: $mr=a*r+(1-a)*mr$, $sr=a*(r-mr)+(1-a)*sr^2$, $mg=a*g+(1-a)*mg$, $sg=a*(g-mg)+(1-a)*sg^2$, $mb=a*b+(1-a)*mb$, and $sb=a*(b-mb)+(1-a)*sb^2$. The pixel is determined to be a background pixel if $|r-mr|<2sr$, $|g-mg|<2sg$, and $|b-mb|<2sb$, and the pixel is determined to be a foreground pixel otherwise.

Still another example aspect provides systems, apparatuses, methods, and computer program products in which depth information of a scene and color data of the scene are received from a capture device. The scene includes a player and a background. A player mask is generated from the depth information, and the edges of the player mask are blurred. An image of the player is output using the color data and depth information, and the image of the player is combined with video data. The image of the player is composited (e.g., feather blended) with the background using the blurred mask as an alpha channel.

Another example aspect provides systems, apparatuses, methods, and computer program products in which an initial state of the scene is set. A background buffer is cleared. The background buffer stores pixels for a background of a scene which includes a player and the background. Depth information of a scene and color data of the scene are received from a capture device. There is a determination of whether each pixel is a foreground pixel or a background pixel according to the depth information. A player mask is generated from the depth information, and the player mask is blurred for a predetermined period of time. Additional areas which are not part of the background according to the depth information and which are part of the moving player according to the color data are located, and the additional areas are filled in using the color data. An image of the player is output using the color data and depth information. The image of the player is combined with video data.

Another example aspect provides systems, apparatuses, methods, and computer program products in which depth information of a scene and color data of the scene are received from a capture device. The scene includes a player and a background. A first detection of the player contour is performed using the depth information, and a second detection of the player contour is performed based on the first detection. The second detection is based on computing a gradient in the color data followed by non-maxima suppression. An image of the player is output based on the player contour, using the color data and depth information. The image of the player is combined with video data.

Yet another example aspect provides systems, apparatuses, methods, and computer program products in which depth information of a scene and color data of the scene are received from a capture device. The scene includes a player and a background. An image-enhancement transform is applied to the color data of the player. An image of the player is output using the color data and depth information. The image of the player is combined with video data.

Another example aspect provides systems, apparatuses, methods, and computer program products in which depth information of a scene and color data of the scene are received from a capture device. The scene includes a player and a background. A player mask is constructed from the depth information. Edge mask smoothing is performed on the player mask. An image of the player is output using the player mask, and the image of the player is combined with video data. In one example, the smoothing can be performed by copying a bitmap image of the scene to a larger texture, downsampling the player mask using a bicubic sharper filter, upsampling the player mask using a bicubic smoother filter to generate a smoothed mask, applying thresholding to the smoothed player mask, and aligning the smoothed player mask with the original player mask after locating the extent of the original player mask using a pixel search.

In that regard, a large blur could be used in place of bicubic down/up sampling. Moreover, bicubic down/upsampling can be simulated using repeated bilinear filtering. Additionally, a variety of filtered resamplers could be used, especially for downsampling, including Lanczos (windowed sinc filters), Mitchell-Netravali (cubic filters), etc. More generally, the process is to downsample to the actual resolution of the data so that hole and block artifacts are effectively removed, and to upsample with a high-quality resampler (such as, but not limited to bicubic) to result in smooth edges. The thresholding pulls in the boundary to match the original boundary.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments presented herein will become more apparent from the detailed description set forth below when taken in conjunction with the drawings.

DETAILED DESCRIPTION

I. Overview

Figure 1:
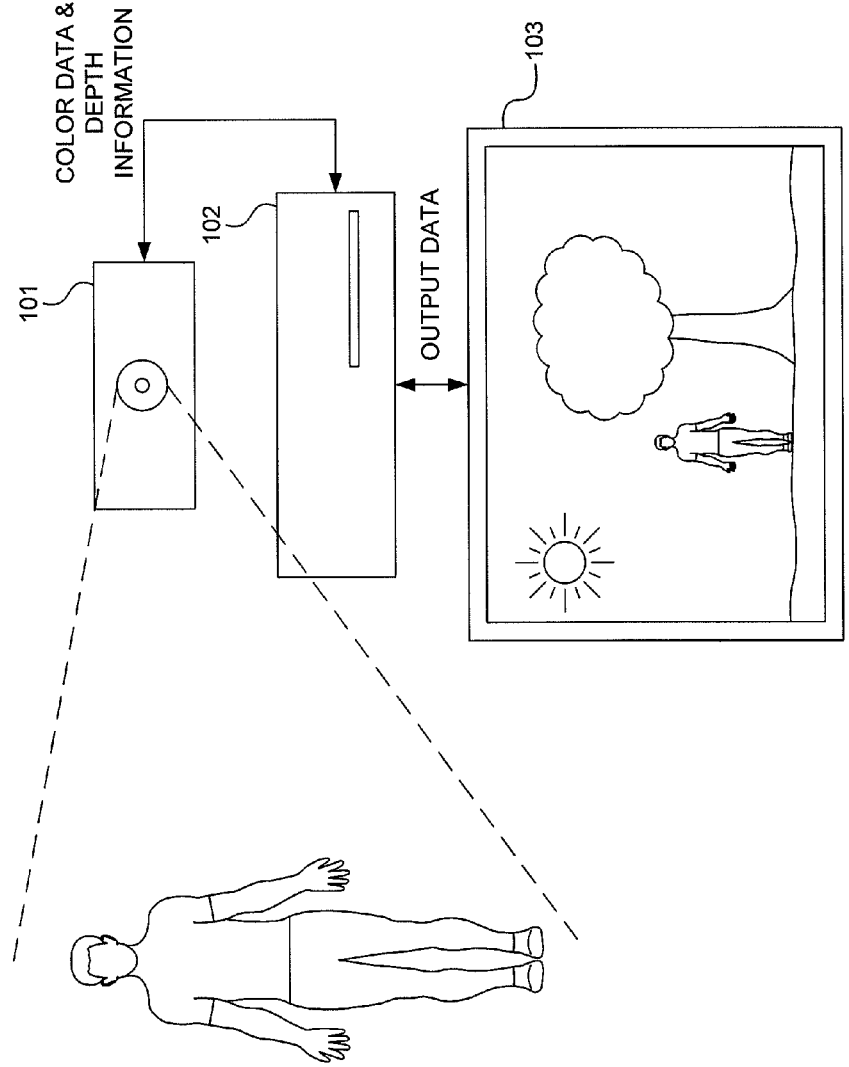
FIG. 1 is a representative view of an environment in which some embodiments of the invention may be practiced.

The example embodiments of the invention presented herein are directed to apparatuses, methods, and computer program products for image processing in an environment using consumer devices. This description is not intended to limit the application of the example embodiments presented herein. In fact, after reading the following description, it will be apparent to one skilled in the relevant art(s) how to implement the following example embodiments in alternative environments, such as a services-based environment, a web services-based environment, etc.

II. Definitions

Some terms are defined below for easy reference. However, it should be understood that the defined terms are not rigidly restricted to their definitions. A term may be further defined by its use in other sections of this description.

"Blu-ray" and "Blu-ray Disc" mean a disc format jointly developed by the Blu-ray Disc Association, and personal computer and media manufacturers including Apple, Dell, Hitachi, HP, JVC, LG, Mitsubishi, Panasonic, Pioneer, Philips, Samsung, Sharp, Sony, TDK and Thomson. The format was developed to enable recording, rewriting and playback of high-definition (HD) video, as well as storing large amounts of data. The format offers more than five times the storage capacity of conventional DVDs and can hold 25 GB on a single-layer disc and 800 GB on a 20-layer disc. More layers and more storage capacity may be feasible as well. This extra capacity combined with the use of advanced audio and/or video codecs offers consumers an unprecedented HD experience. While current disc technologies, such as CD and DVD, rely on a red laser to read and write data, the Blu-ray format uses a blue-violet laser instead, hence the name Blu-ray. The benefit of using a blue-violet laser (about 405 nm) is that it has a shorter wavelength than a red or infrared laser (about 650-780 nm). A shorter wavelength makes it possible to focus the laser spot with greater precision. This added precision allows data to be packed more tightly and stored in less space. Thus, it is possible to fit substantially more data on a Blu-ray Disc even though a Blu-ray Disc may have substantially similar physical dimensions as a traditional CD or DVD.

"Compact Disc" (CD) means a disc used to store digital data. The CD was originally developed for storing digital audio. Standard CDs have a diameter of 740 mm and can typically hold up to 80 minutes of audio. There is also the mini-CD, with diameters ranging from 60 to 80 mm. Mini-CDs are sometimes used for CD singles and typically store up to 24 minutes of audio. CD technology has been adapted and expanded to include without limitation data storage CD-ROM, write-once audio and data storage CD-R, rewritable media CD-RW, Super Audio CD (SACD), Video Compact Discs (VCD), Super Video Compact Discs (SVCD), Photo CD, Picture CD, Compact Disc Interactive (CD-i), and Enhanced CD. The wavelength used by standard CD lasers is about 650-780 nm, and thus the light of a standard CD laser typically has a red color.

"Consumer" and the like means a consumer, user, client, and/or client device in a marketplace of products and/or services.

"Content" and the like is generally understood to include multimedia content such as games, videos, television shows, movies, and broadcasts of various types. Similarly, "content data" refers to the data that includes content. Content (in the form of content data) may be stored on, for example, a Blu-Ray Disc, Compact Disc, Digital Video Disc, floppy disk, mini disk, optical disc, micro-drive, magneto-optical disk, ROM, RAM, EPROM, EEPROM, DRAM, VRAM, flash memory, flash card, magnetic card, optical card, nanosystems, molecular memory integrated circuit, RAID, remote data storage/archive/warehousing, and/or any other type of storage device.

"Device" means software, hardware or a combination thereof. A device may sometimes be referred to as an apparatus. Examples of a device include without limitation a software application such as Microsoft Word™, a laptop computer, a database, a server, a display, a computer mouse, and a hard disk.

"Digital Video Disc" (DVD) means a disc used to store digital data. The DVD was originally developed for storing digital video and digital audio data. Most DVDs have substantially similar physical dimensions as compact discs (CDs), but DVDs store more than six times as much data. There is also the mini-DVD, with diameters ranging from 60 to 80 mm. DVD technology has been adapted and expanded to include DVD-ROM, DVD-R, DVD+R, DVD-RW, DVD+RW and DVD-RAM. The wavelength used by standard DVD lasers is about 605-650 nm, and thus the light of a standard DVD laser typically has a red color.

"Network" means a connection between any two or more computers, which permits the transmission of data. A network may be any combination of networks, including without limitation the Internet, a network of networks, a local area network (e.g., home network, intranet), a wide area network, a wireless network and a cellular network.

"Server" means a software application that provides services to other computer programs (and their users), in the same or another computer. A server may also refer to the physical computer that has been set aside to run a specific server application. For example, when the software Apache HTTP Server is used as the web server for a company's website, the computer running Apache is also called the web server. Server applications can be divided among server computers over an extreme range, depending upon the workload.

"Software" and "application" mean a computer program that is written in a programming language that may be used by one of ordinary skill in the art. The programming language chosen should be compatible with the computer by which the software application is to be executed and, in particular, with the operating system of that computer. Examples of suitable programming languages include without limitation Object Pascal, C, C++, and Java. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in a separate section below.

"System" means a device or multiple coupled devices. A device is defined above.

"User device" (e.g., "client", "client device", "user computer") is a hardware system, a software operating system and/or one or more software application programs. A user device may refer to a single computer or to a network of interacting computers. A user device may be the client part of a client-server architecture. A user device typically relies on a server to perform some operations. Examples of a user device include without limitation a television (TV), a CD player, a DVD player, a Blu-ray Disc player, a personal media device, a portable media player, an iPod™, a Zoom Player, a laptop computer, a palmtop computer, a smart phone, a cell phone, a mobile phone, an MP3 player, a digital audio recorder, a digital video recorder (DVR), a set top box (STB), a network attached storage (NAS) device, a gaming device, an IBM-type personal computer (PC) having an operating system such as Microsoft Windows™, an Apple™ computer having an operating system such as MAC-OS, hardware having a JAVA-OS operating system, and a Sun Microsystems Workstation having a UNIX operating system.

III. System

FIG. 1 is a representative view of an environment in which some embodiments of the invention may be implemented. As shown in FIG. 1, capture device 101 is connected with image processing device 102, which in turn is connected with display device 103. A user stands in the vicinity of a scene captured by capture device 101, and an image of the user is displayed on display device 103 along with other image data.

More specifically, capture device 101 is a device which may include hardware and/or software for capturing depth information of a scene, as well as color data of a scene. For example, a color camera and/or CMOS sensor may capture color data such as YUV data, RGB data or data in other color spaces, whereas an infrared sensor or other depth sensing technology may capture depth information of the scene (e.g., where a player is standing in three dimensions in relation to other objects). The depth information and color data may then be transferred to other devices for processing, such as image processing device 102.

Image processing device 102 is a device which processes the depth information and color data output by capture device 101 in order to generate output for display on display device 103. In one example as shown in FIG. 1, image processing device might use the depth information and color data of the scene to generate a player image which is inserted into an output video scene on display device 103. In FIG. 1, image processing device 102 is shown as a video game system console, although image processing device 102 could also be embodied as, for example, a desktop or laptop computer, a set-top box, or as part of display device 103, among many other embodiments.

Display device 103 outputs image and/or video data from image processing device 102, such as a display of the player combined with video data as shown in FIG. 1. In FIG. 1, display device 103 is depicted as a television, but display device 103 could be embodied as several other types of display devices, including a standalone monitor, a laptop screen, or a projection device, among others.

In that regard, while FIG. 1 depicts capture device 101, image processing device 102 and display device 103 as three separate devices, in other embodiments these devices might be combined into a single device or any other number of devices. Moreover, while capture device 101, image processing device 102 and display device 103 are shown in the same local area, these devices could also be located remotely from each other, and could communicate via a wired or wireless network.

IV. Device

Figure 2:
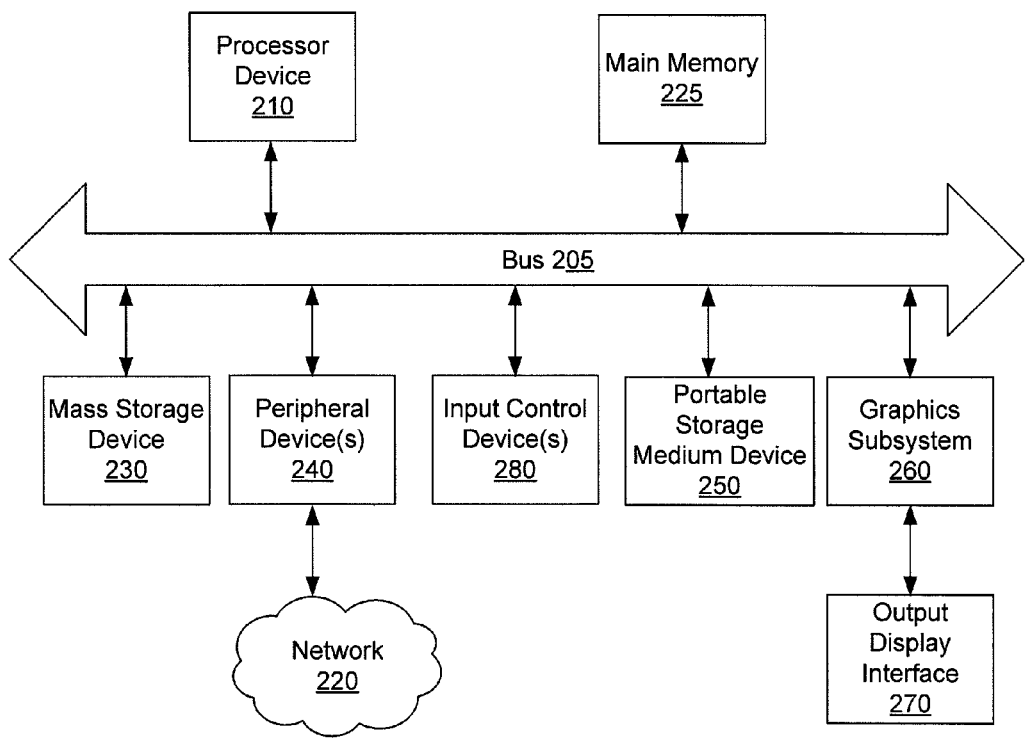
FIG. 2 is a block diagram of an image processing device for use with various example embodiments of the invention.

FIG. 2 is a block diagram of image processing device 102, which may be a general and/or special purpose computing device, in accordance with some of the example embodiments of the invention. The image processing device 102 may be, for example, a game console as shown in FIG. 1, a user device, a user computer, a client computer and/or a server computer, among other things.

The image processing device 102 may include without limitation a processor device 210, a main memory 225, and an interconnect bus 205. The processor device 210 may include without limitation a single microprocessor, or may include a plurality of microprocessors for configuring the image processing device 102 as a multi-processor system. The main memory 225 stores, among other things, instructions and/or data for execution by the processor device 210. The main memory 225 may include banks of dynamic random access memory (DRAM), as well as cache memory.

The image processing device 102 may further include a mass storage device 230, peripheral device(s) 240, portable storage medium device(s) 250, input control device(s) 280, a graphics subsystem 260, and/or an output display interface 270. For explanatory purposes, all components in the image processing device 102 are shown in FIG. 2 as being coupled via the bus 205. However, the image processing device 102 is not so limited. Devices of the image processing device 102 may be coupled via one or more data transport means. For example, the processor device 210 and/or the main memory 225 may be coupled via a local microprocessor bus. The mass storage device 230, peripheral device(s) 240, portable storage medium device(s) 250, and/or graphics subsystem 260 may be coupled via one or more input/output (I/O) buses. The mass storage device 230 may be a nonvolatile storage device for storing data and/or instructions for use by the processor device 210. The mass storage device 230 may be implemented, for example, with a magnetic disk drive or an optical disk drive. In a software embodiment, the mass storage device 230 is configured for loading contents of the mass storage device 230 into the main memory 225.

The portable storage medium device 250 operates in conjunction with a nonvolatile portable storage medium, such as, for example, a compact disc read only memory (CD-ROM), to input and output data and code to and from the image processing device 102. In some embodiments, software for storing image data may be stored on a portable storage medium, and may be inputted into the image processing device 102 via the portable storage medium device 250. The peripheral device(s) 240 may include any type of computer support device, such as, for example, an input/output (I/O) interface configured to add additional functionality to the image processing device 102. For example, the peripheral device(s) 240 may include a network interface card for interfacing the image processing device 102 with a network 220.

The input control device(s) 280 provide a portion of the user interface for a user of the image processing device 102. The input control device(s) 280 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the image processing device 102 may include the graphics subsystem 260 and the output display interface 270. The output display interface 270 may include hardware for interfacing with a cathode ray tube (CRT) display and/or a liquid crystal display (LCD) such as display device 103. The graphics subsystem 260 receives textual and graphical information, and processes the information for output to the output display interface 270.

Each component of the image processing device 102 may represent a broad category of a computer component of a general and/or special purpose computer. Components of the image processing device 102 are not limited to the specific implementations provided here.

V. Processes

A. Noise Reduction in Input Color Image

In some image capture environments, input color data from a capture device may include a significant amount of noise, which can lead to negative effects throughout the processing pipeline. Therefore, noise filtering is performed to reduce these negative effects and improve the visual quality of the output video. In that regard, the noise filtering can be performed in combination with other techniques described herein.

Figure 3:
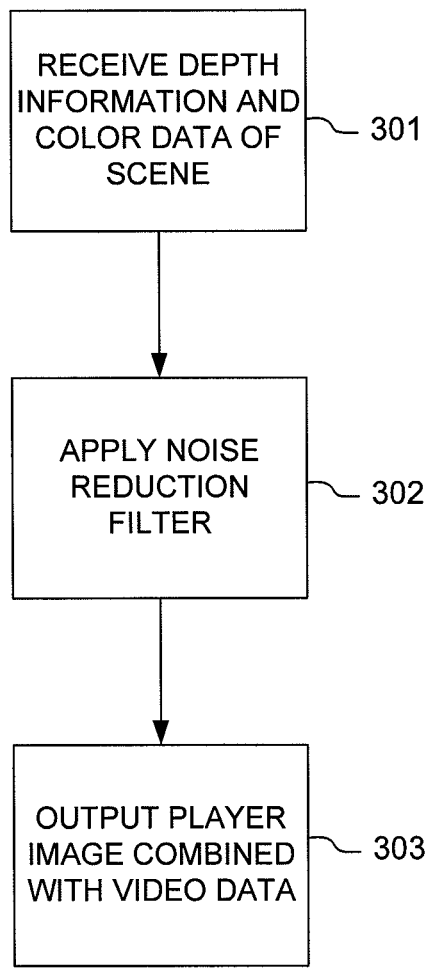
FIG. 3 is a flowchart diagram showing an exemplary procedure for noise reduction in a color image.

Accordingly, an exemplary process for noise reduction will be described with respect to FIG. 3.

Briefly, depth information of a scene and color data of the scene are received from a capture device. The scene includes a player and a background. A noise reduction filter is applied to the color data. An image of the player is output using the color data and depth information. The image of the player is combined with video data.

In more detail, in step 301, depth information of a scene and color data of the scene are received from a capture device, such as capture device 101. The scene may include at least one player, as shown in FIG. 1.

In step 302, a noise reduction filter is applied to the color data. In one example, the filter might be a median filter or a hybrid median filter. In another example, the filter could be a bilateral filter. Of course, other filters and hybrid/approximate filters are possible. Application of certain filters in an environment including a Graphics Processing Unit (GPU) are described in "Image Processing & Video Algorithms With CUDA", by Eric Young and Frank Jargstorff, in NVISION08 (2008), the contents of which are incorporated by reference herein.

In that regard, the filter could be applied to the incoming color data of the scene in a temporal dimension, instead of or in conjunction with a spatial dimension. Filters could also be used for upsampling, contrast management, and the like. In still another example, an approximation of a bilateral filter could be constructed by using a box filter for color intensities and a tent filter for spatial distance.

As an additional intermediary step, it might also be helpful to interpolate between the original data and the filtered data in an effort to preserve detail, as described at http://pixinsight.com/doc/legacy/LE/19_morphological/median_filter/median_filter.html, by Pleiades Astrophoto (2004). Moreover, additional filters or processes could be used to remove low frequency noise once high frequency noise is removed. An example noise reduction process which detects edges and interpolates between an original and a blurred copy might include the following steps:

1. Detect edges using an appropriate filter (Sobel, Laplace, etc.) and store as an image.
2. Make a copy of the image and blur with Gaussian, Box, etc.
3. Interpolate between the original and blurred image using the edge image as a mask. Where the mask is the most extreme value, use 100% of the original image, where the mask is the least extreme, use 100% of the blurred image, and interpolate between the two images based on the relative value of the edge image (e.g. at edge value 0.5, use blend 50/50 for the output).

Thus, in this example, the interpolation includes detecting edges in the scene using an edge detection filter, storing the detected edges as an edge image, blurring a copy of the edge image, and interpolating between the original edge image and blurred edge image using the original edge image as a mask. In this way, edges will ordinarily remain sharper, while large areas filled with noise will be smoothed out.

Therefore, the original image can be selectively blurred using the edge-detected image as a variable mask, such that sharp edges are minimally blurred or are not blurred, non-edge areas are maximally blurred, and in-between areas (areas with intermediate sharpness) are partially blurred. For example, the blur could use a Laplacian masked blur, a Gaussian approximation, or a box blur using, for example, a 5×5 box or a 3×3 box, although the kernels might need to be larger to get enough blur to reduce noise.

In step 303, an image of the player is output, using the (filtered) color data and depth information. The image of the player is combined with video data. For example, as shown in FIG. 1, the live player is shown as part of the display on display device 103.

B. Adaptive Statistical Color Background Model

In some cases, depth information from the capture device can be of significantly lower resolution than the resolution of color video from the capture device. Further, the depth information may be highly unstable around depth discontinuities, e.g., near the contours of the players' silhouette. These issues result in various artifacts which may degrade the perceptual quality of the output video stream including the player and the game video.

Accordingly, an adaptive statistical background color model may improve segmentation (e.g., between the player and the background) by adapting to long-term changes in background lighting, and taking into account each pixel's color variability in foreground/background labeling.

In particular, color statistics for each pixel can be maintained, and the distributions can be updated regularly. When used for segmentation into foreground/background, the color values for each pixel can be compared to the model distribution. The decision to label a pixel as foreground or background can then be subject to a threshold expressed as a multiple of the distribution's standard deviation. Update and threshold rules can be applied to the R, G and B planes independently, and the results combined for a final pixel label in a way which biases towards the desired effect, e.g., an AND combination will be biased more towards foreground pixels, and an OR combination will be biased towards more holes in the foreground.

The adaptive statistical background color model, when used in conjunction with the depth information from the capture device, ordinarily will contribute to computing a more accurate and robust player mask. In particular, it is ordinarily possible to determine player boundaries from color matching which are more precise and less noisy than those computed from the depth information alone, and to detect and account for sudden drastic illumination changes. Moreover, it may be possible to reduce "halo" or "trace" effects near the player border.

Figure 4:
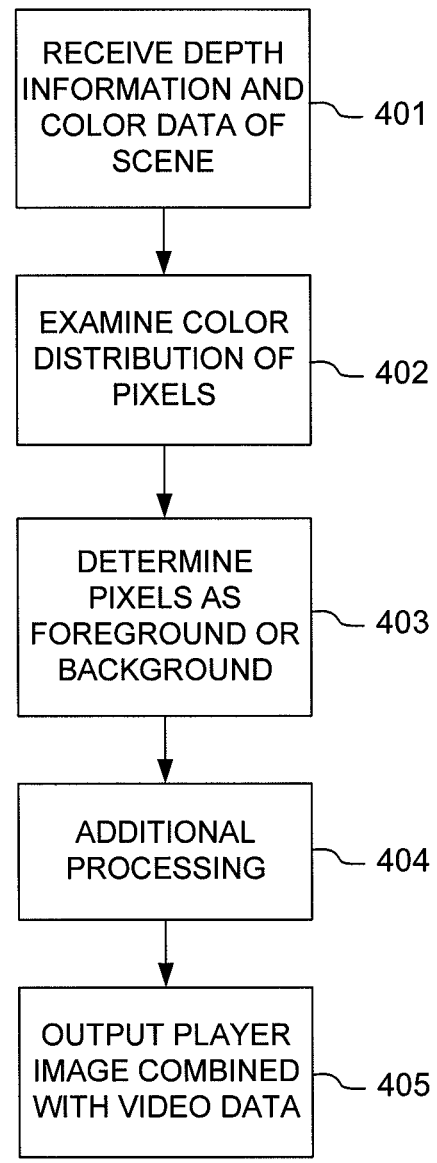
FIG. 4 is a flowchart diagram showing an exemplary procedure for generating a color background model.

Accordingly, an exemplary process for constructing an adaptive statistical background color model will be described with respect to FIG. 4.

Briefly, depth information of a scene and color data of the scene are received from a capture device. The scene includes a player and a background. A background model of the scene is constructed by performing, for each pixel, steps of storing the position of the pixel as p and the color components of the pixel as r, g, b, initializing a model pixel at the same position p with color component distribution G(mr, sr), G(mg, sg), G(mb, sb), initializing a variable "a" as an update weight, and updating the values of the model pixel according to the following:

$mr = a*r + (1-a)*mr$ $sr = a*(r-mr) + (1-a)*sr^2$ $mg = a*g + (1-a)*mg$ $sg = a*(g-mg) + (1-a)*sg^2$ $mb = a*b + (1-a)*mb$, and $sb = a*(b-mb) + (1-a)*sb^2$.

The pixel is determined to be a background pixel if $|r-mr|<2sr$, $|g-mg|<2sg$, and $|b-mb|<2sb$, and the pixel is determined to be a foreground pixel otherwise.

In more detail, in step 401, depth information of a scene and color data of the scene are received from a capture device, such as capture device 101. The scene may include at least one player, as shown in FIG. 1.

In step 402, the color distribution of pixels is examined. Thus, for each component, the distance between the observed value and the mean value at the background pixel can be checked against a threshold that is a multiple of the standard deviation of the pixel. In this regard, the multiple of the standard deviation used for thresholding can vary (e.g., 2, 3, 4 . . . ). Additionally, the operations can be performed on the squares of the values; there is ordinarily no need to compute square roots.

The results from each color component can then be aggregated in one of several ways, such as classifying a pixel as foreground if the observed value is too far from the mean for any of the components.

Thus, in step 403, there is a determination of whether a pixel is foreground or background. In particular, as noted above, the pixel is determined to be a background pixel if $|r-mr|<2sr$, $|g-mg|<2sg$, and $|b-mb|<2sb$, and the pixel is determined to be a foreground pixel otherwise. In one example, if the pixel is determined as a background pixel, the color data from the capture device is used to update the model, whereas if the pixel is in the foreground, the color data is not used to update the model (e.g., to avoid overwriting the image of the player).

In step 404, additional processing may be performed using the adaptive statistical background model. For example, the model might be adjusted to compensate for sudden drastic changes in lighting, as described in detail below in section (D).

In step 405, an image of the player is output, using the color data and depth information. The image of the player is combined with video data. For example, as shown in FIG. 1, the live player is shown as part of the display on display device 103.

For purposes of initializing values for the above process, a first image can be captured, or other reasonable predetermined values can be used. In addition, the variances may also be initialized with reasonable initial values. To that end, it might be helpful to introduce a minimum value for variance. In one example, the variance in background color can be stored, and used to decide whether an observation (a color value in the current frame) is likely an observation of the background (if it is close enough to the average color of that background pixel), or if it is occluded by a foreground object.

In some embodiments, it might also be useful to use color formats other than RGB. For example, operations could be performed in a YUV (i.e., YCbCr) color space or any other readily available color format that separates intensity from color, which might reduce or separate out lighting problems, i.e., improve robustness to sudden drastic changes in lighting. In another example, an HSV color model could be used.

In still another aspect, the variable update weight "a" above could represent a variable update weight in a low-pass filter, based on the confidence in the segmentation label (foreground or background), e.g., 1-alpha value of the final mask. This way, definite background pixels would contribute significantly to the background model update, definite foreground pixels would not contribute at all, and pixels on the border would contribute, but less significantly. For example, pixels which are relatively definite to be background pixels could be assigned a relatively high value for the weight "a", pixels which are relatively definite to be foreground pixels could have "0" assigned for the weight "a", and pixels between these two extremes could be have intermediate values for the weight "a".

Of course, modeling need not be limited to the above processes. For example, color matching could use a simple volume check for a 3D non-uniform box.

C. Blending Near Mask Edges

Certain imperfections in the player mask such as noise may produce instabilities or flickering at the edges of the player mask. Humans are extremely sensitive to such discontinuities, and as such it would be useful to reduce the visual saliency of such imperfections.

Figure 5:
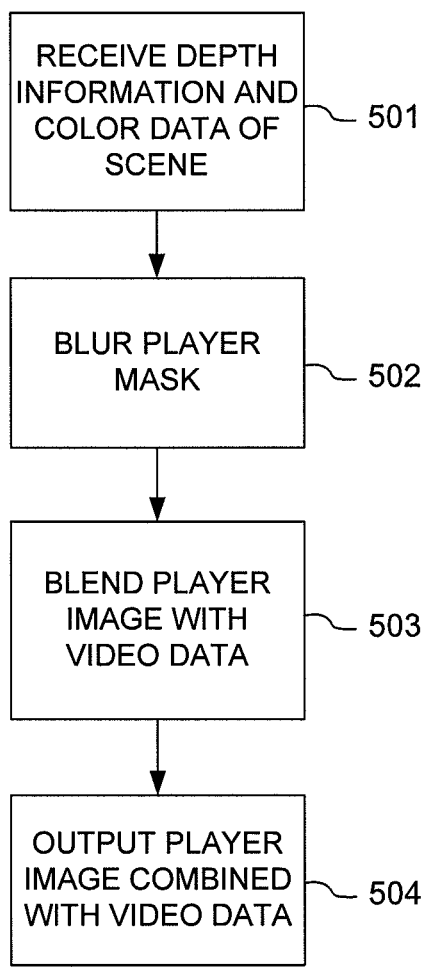
FIG. 5 is a flowchart diagram showing an exemplary procedure for blending near mask edges.
Figure 6:
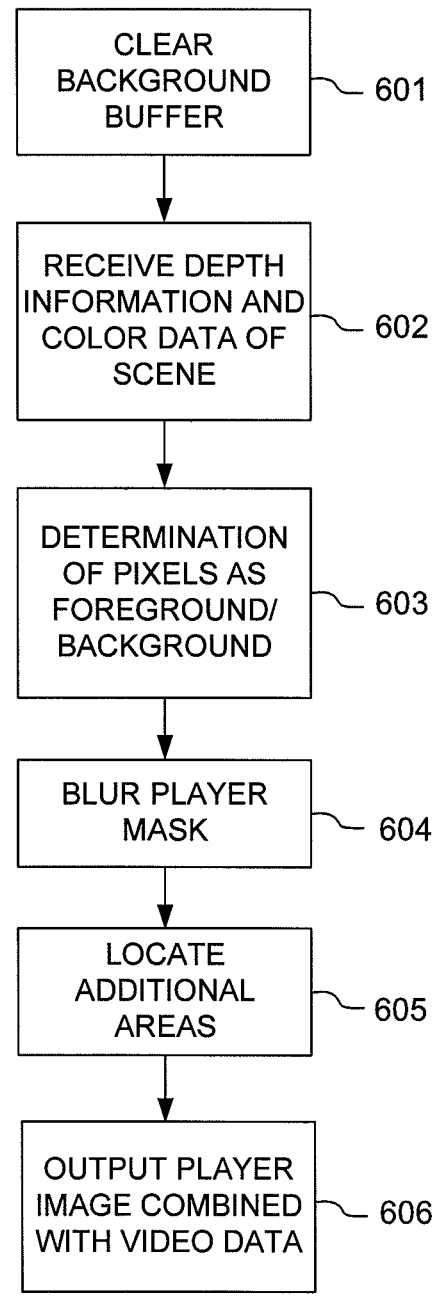
FIG. 6 is a flowchart diagram showing an exemplary procedure for segmenting pixels.

Accordingly, an exemplary process for blending near mask edges will be described with respect to FIG. 5.

Briefly, depth information of a scene and color data of the scene are received from a capture device. The scene includes a player and a background. A player mask is generated from the depth information, and the edges of the player mask are blurred. An image of the player is output using the color data and depth information, and the image of the player is combined with video data. The image of the player is composited with the video data using the blurred mask as an alpha channel.

In more detail, in step 501, depth information of a scene and color data of the scene are received from a capture device, such as capture device 101. The scene may include at least one player, as shown in FIG. 1.

In step 502, edges of the player mask are blurred, so as to make any discontinuities at the edge of the mask less obvious and to improve final compositing with the background image. More specifically, in step 502, the mask is treated as an 8 bit (or more) alpha channel and blurred in order to create soft edges for improving the quality of the final composited image. The edges could be blurred using, for example, Gaussian blur, separable box blur, a box blur, separable Gaussian blur, and filtered downsampling followed by filtered upsampling, among others.

In step 503, the player image is alpha blended with the video background using the mask as an alpha channel, so as to generate a more visually acceptable change from the player to the video. Other blending methods may also be used.

In step 504, an image of the player is output, using the color data and depth information. Thus, the image of the player is composited with the video data using the blurred mask as an alpha channel. The image of the player is combined with video data. For example, as shown in FIG. 1, the live player is shown as part of the display on display device 103.

D. Valid Initial State

When the capture device captures the depth information and color data for use in construction of a player mask, instabilities and irregularities in the initial state such as lighting changes may lead to problems in subsequent processing. Accordingly, according to some embodiments, a valid initial state is set for the captured scene.

1. Valid Initial State and Updating the Color Background with Valid Data

A valid initial scene can help increase reliability and stability for subsequent processing. Depth segmentation information from the capture device can be used to determine a player area with relatively high confidence, with everything else in the scene determined as the background. In that regard, one way to reduce artifacts is to refrain from, or reduce, color matching until it is certain that valid background data has been received from the capture device.

Thus, according to an example embodiment, an initial state of the scene is set. A background buffer is cleared. The background buffer stores pixels for a background of a scene which includes a player and the background. Depth information of a scene and color data of the scene are received from a capture device. There is a determination of whether each pixel is a foreground pixel or a background pixel according to the depth information. A player mask is generated from the depth information, and the player mask is blurred for a predetermined period of time. Additional areas which are not part of the background according to the depth information and which are part of the moving player according to the color data are located, and the additional areas are filled in using the color data. An image of the player is output using the color data and depth information. The image of the player is combined with video data.

In more detail, in step 601, a background buffer which stores data for background pixels is cleared, since, in determining the initial state, no background pixels should be known at that time.

In step 602, depth information of a scene and color data of the scene are received from a capture device, such as capture device 101. The scene may include at least one player, as shown in FIG. 1.

In step 603, there is a determination of whether each pixel is a foreground pixel or a background pixel, according to the depth information. In particular, using the depth information, a basic distinction between foreground and background pixels can be made.

In step 604, as an initial condition state for a predetermined period of time, e.g., ½ second, the output player mask is blurred, so as to hide edge areas which may be somewhat imprecise due to only using the relatively coarse depth segmentation data at that point. Over the ½ second, the blur can be scaled down as the player moves to fill in the actual background, and a more robust color segmentation comparison can then be used, as described below. Thus, generally, the valid initial state is set by first blurring the output player mask in areas where color segmentation will be checked, but while the area still does not have a known background color value.

In step 605, additional areas which are not part of the background according to the depth information but which are part of the moving player according to the color data are located, for example using the adaptive statistical background color model discussed above. Thus, color segmentation is run on pixels set as background pixels by a depth segmentation (e.g., using new mean/variance buffers for the color segmentation). Color matching can then be used to fill in such areas, which might include holes or missing edges.

In step 606, an image of the player is output, using the color data and depth information. The image of the player is combined with video data. For example, as shown in FIG. 1, the live player is shown as part of the display on display device 103. As mentioned above, the image of the player can be composited with the video data using a blurred player mask as an alpha channel.

In more detail, pseudocode for implementing the above process could be as follows:

```
newVarS = abs(newS - meanS); // Values at x,y
if (newVarS < 2*varS) {
if (isDepthBackgroundAt(x,y)) {
     storeCurrentPixelRGBAsBackgroundColor(x,y); // Set pixel Boolean
as background,
                                      // store RGB values for pixel.
     upateMaskAsBackgroundAt(x,y);
     } else {
          updateMaskAsPlayerAt(x,y);
     } // if
} else {
// Ignore this depth seg pixel as spurious noise: don't change mask at this
time
} // if
varS = varS + (newVarS - varS)*fsv; // fsv: LP filter seg variance (0-1)
meanS = meanS + (newS - meanS)*fsm; // fsm: LP filter seg mean
(0-1)
// RGB color values, R = red (duplicate code for G,B).
if (pixelHasBackgroundRGBAt(x,y)) { // Did we get RGB background for
this pixel yet?
     newVarR = abs(newR - meanR); // Values at x,y
     if (newVarR < 2*varR) {
               upateMaskAsBackgroundAt(x,y);
     } else {
               upateMaskAsPlayerAt(x,y);
     } // if
     varR = varR + (newVarR - varR)*fcv; // fcv: LP filter color variance
```

-continued

```
    (0-1)
    meanR = meanR + (newR - meanR)*fcm; // fcm: LP filter color
    mean (0-1)
} else {
    // Blurring output mask to hide that there may not be valid
    background
    // RGB to use to check color for color segmentation.
} // if
```

Of course, other implementations may be possible. In addition, color variance could be used to determine where to blur the depth-segmented-only mask, as the varying area might also represent the moving player.

2. Lighting Change Detection

In some instances, lighting changes or other complications may cause the color background model (e.g., data stored in a color background buffer) to become invalid. If the background model is determined to be invalid, the background model of the scene can be reset to an initial state.

For example, when significant lighting changes occur, the color background may become invalid and cause rendering artifacts. Lighting change detection can be used to reset the system back into a valid initial state of a known visual quality when a such changes are detected. A full histogram approach can be used, as can a 2-bin-histogram-like solution which counts pixels in the player mask.

Thus, according to one example embodiment, a frame histogram is computed for each frame, and a low-pass filtered mean of the frame histogram is computed. The computed frame histogram is compared against a prior histogram. A histogram variance and a low-pass filtered variance are computed. If the histogram variance for R, G or B exceeds more than twice the low-pass filtered variance for R, G or B, the background buffer is re-cleared, and segmentation is reset to the initial state.

Another example process for dealing with sudden changes in lighting is to check the number of pixels in the foreground mask computed from color matching in the whole frame. The number should remain very stable when only a player area has been segmented. If the number becomes much larger, it is an indication that something went "wrong" and that the current background model is no longer valid. Thus, in this example, the number of pixels in the foreground mask in each whole frame are calculated, and if the number increases past a threshold value, the background model is determined to be invalid and is reset to the initial state.

Another test to detect sudden changes in lighting would be if a high number of pixels in an area are marked as foreground while the depth mask (from the captured depth information) strongly indicates that the same area is background. In such a case, it is likely that the color model is no longer valid. Accordingly, in this example, the number of pixels in the foreground mask in each whole frame are calculated, and if a threshold value of pixels in an area are marked as foreground while the depth information indicates that the same area is background, the background model is determined to be invalid and is reset to the initial state.

In still another example, lighting changes could be detecting by computing the average pixel luminosity and checking for large interframe changes.

In yet another example, the number of pixels in the player mask could be counted. In such an example, if the number exceeded a threshold change per frame, it could be concluded the mask is likely broken due to a significant lighting change, whereby resetting to a valid initial state is required.

3. Initial State Mask Enhancements

As indicated above, initially, regions where the depth information are missing may show up as holes. In more detail, depth resolution from the capture device may have relatively low resolution, particularly as compared to color data. After the initial state is set, the color background behind the player may not have yet been updated, and as such, regions where the depth information are missing may show up as holes or edge artifacts. The statistical background color model and color matching mentioned above may be used to ultimately improve quality for these regions. Still, during the initial state, the background color for areas such as the top of the shoulder and head may not be known. Accordingly, it would be useful to improve the quality of the mask until the background color is updated.

According to one example, the mask can be dilated upwards to mark areas to use color matching. It is possible to know which pixels have not yet been updated with valid color data by, for example, using GPU code to count pixels and compute an average x,y area (and/or min-max box).

In addition, indicators can be displayed to direct movement so that areas or portions of the background obscured by the player can be updated. Thus, the user can then be directed with arrows or other indicators to move in the correct direction, so that the pixels for the background area can be updated.

Additionally, skeletal and mask data could be used to temporarily update the mask and render user/foreground pixels without updating the color background buffer. For example, if the player body is treated as a large rounded rectangle and the arms and legs treated similarly, these rounded rectangles can be aligned to the moving skeletal data to provide regions which will likely contain player surface area (such as with an avatar mapped to the skeletal data) which can be treated as player pixels, as opposed to background or unknown pixels. According to this process, it might be possible to fill in holes while still reducing or avoiding artifacts once the user starts moving. In still another aspect, extra blur could be applied near the color matching regions, to help fill in holes and hide artifacts until the player moves. Since the holes may occur upon significant lighting changes, the above processes may be helpful even in a case where the system already uses a "step in-step out" process to direct a player when to step into the range of the capture device.

E. Masking: Fine Contour Detection

In some cases, it might be possible to further refine contour detection, i.e., detection of the boundary between the player and the background. In that regard, a silhouette contour mask can be generated from the depth information alone. However, the area of the mask may capture uncertainty around depth discontinuities, and as such, edges detected in the input image and color model are generally used to decide mask pixels under the silhouette mask.

Nevertheless, other methods can be used which may improve upon edge detection. In particular, a hybrid method using temporally accumulated depth contour for coarse detection, and color (or intensity) edge-based contour refinement, can improve the smoothness and temporal stability of the mask contour while reducing "ghosting". Thus, for a more robust mask, a first phase could maintain a silhouette contour mask (perhaps accumulated over a small number of frames to account for instabilities in depth discontinuities), whereas a second phase could compute the gradient in the current color (or intensity) image followed by non-maxima suppression.

Figure 7:
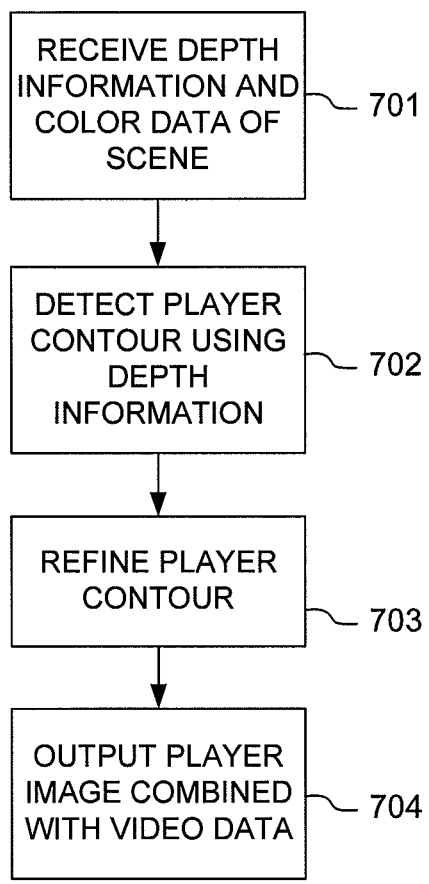
FIG. 7 is a flowchart diagram showing an exemplary procedure for contour detection.

Therefore, an exemplary process for refining player contours will be described with respect to FIG. 7.

Briefly, depth information of a scene and color data of the scene are received from a capture device. The scene includes a player and a background. A first detection of the player contour is performed using the depth information, and a second detection of the player contour is performed based on the first detection. The second detection is based on computing a gradient in the color data followed by non-maxima suppression. An image of the player is output based on the player contour, using the color data and depth information. The image of the player is combined with video data.

In more detail, in step 701, depth information of a scene and color data of the scene are received from a capture device, such as capture device 101. The scene may include at least one player, as shown in FIG. 1.

In step 702, a first detection of the player contour is performed based on the received depth information. For example, a silhouette contour mask can be generated from the depth information alone, after accumulating over a small number of frames to account for instabilities in depth discontinuities.

In step 703, a second detection of the player contour is performed based on the first detection, i.e., to refine the first detection. The second detection is based on computing a gradient in the color data followed by non-maxima suppression.

As one example of the second detection, a closed adaptive curve (generally known as an active contours or "snake") can be fitted to best match edge data, by iterative relaxation. Other approaches, such as Live Wire and Graph Cuts, typically used in interactive settings, could be adapted to perform automatic segmentation under the spatial constraints introduced by the silhouette contour mask.

More specifically, the active contours or "snakes" model is a framework for delineating an object outline from a possibly noisy 2D image. The framework attempts to minimize an energy associated to the current contour as a sum of an internal and external energy. Specifically, the external energy is supposed to be minimal when the snake is at the object boundary position (usually based on some form of edge detection). The internal energy is designed to be minimal when the snake has a shape that is most consistent with the properties of the target object. The most straightforward approach grants high energy to elongated contours (elastic force) and to bended/high curvature contours (rigid force), favoring shapes that are regular and smooth. A similar approach is delineated in Alexandre R. J. François, *Semantic, Interactive Manipulation of Visual Data*, Ph.D. dissertation/IRIS Technical Report IRIS-01-409, University of Southern California, Los Angeles, December 2000, the contents of which are incorporated by reference herein. See also M. Kass, A. Witkin, and D. Terzopoulos, "*Snakes—Active Contour Models*", International Journal of Computer Vision, 1(4): 321-331, 1987.

Meanwhile, Livewire, also known as Intelligent Scissors, is a segmentation technique which allows a user to select regions of interest to be extracted quickly and accurately, using simple mouse clicks. It is based on the lowest cost path algorithm, by Edsger W. Dijkstra. A Sobel filter is applied, and a graph is constructed, of which each pixel of the Sobel image is a vertex, with edges going to the 4-connected pixels. Edges have cost (e.g. gradient magnitude), and from any two points, the lowest cost path can be computed efficiently and corresponds to a contour if the cost function is set properly. See E. Mortensen, et al., "*Intelligent scissors for image composition*", In: SIGGRAPH '95: Proceedings of the 22nd annual conference on Computer graphics and interactive techniques. New York, N.Y., USA: ACM Press, p. 191-198, 1995.

In "Graph Cuts", a cut is a partition of the vertices of a graph into two disjoint subsets. Graph cuts can be applied in computer vision to efficiently solve a number of low-level problems, including labeling. The problem is formulated in terms of energy minimization, a class of problems that can be reduced to instances of the maximum flow problem in a graph (and thus, by the max-flow min-cut theorem, define a minimal cut of the graph). See, e.g., Y. Boykov and M.-P. Jolly, "*Interactive graph cuts for optimal boundary & region segmentation of objects in n-d images*," in International Conference on Computer Vision (ICCV), 2001. A graph cut approach for fine contour detection could work automatically under the constraints of the silhouette mask.

In step 704, an image of the player is output, using the color data and depth information and based on the player contour. The image of the player is combined with video data. For example, as shown in FIG. 1, the live player is shown as part of the display on display device 103.

F. Compositing: Image-enhancing Color Transform of Insert

In addition to improving masking quality of the player insert, it may be possible to further increase the visual immersion of the player into the scene by performing some form of intensity/color correction.

More specifically, in some cases the color data provided by the capture device is noisy and of a lesser quality than, for example, the video data which the player image is to be inserted into. While high-quality masking helps to improve seamless compositing of the player insert into the output video scene, adjusting white balance and color intensity range and dynamics may further improve output. Thus, image enhancing transforms, such as histogram-based transforms, could yield significant improvements in the quality of the final output video stream, while ordinarily computationally inexpensive and not requiring manual settings by the user. Put another way, HSV (hue, saturation, and value) space transforms whose parameters are set interactively can make the color of the composited region more compatible with the color properties of the video image.

Figure 8:
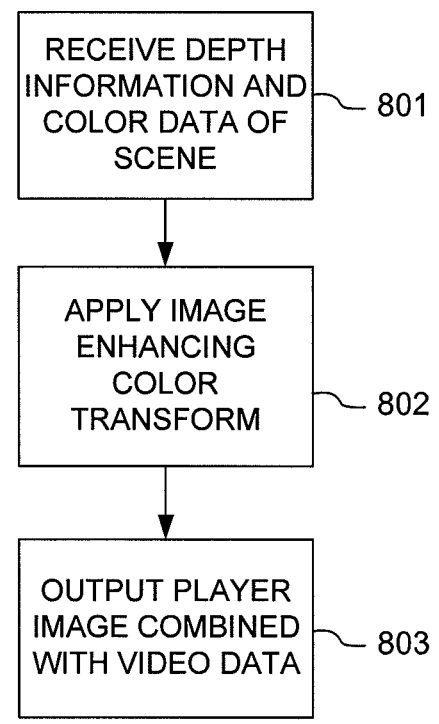
FIG. 8 is a flowchart diagram showing an exemplary procedure for color enhancement.

Accordingly, an exemplary process for color correction will be described with respect to FIG. 8.

Briefly, depth information of a scene and color data of the scene are received from a capture device. The scene includes a player and a background. An image-enhancing transform is applied to the color data of the player. An image of the player is output using the color data and depth information. The image of the player is combined with video data.

In more detail, in step 801, depth information of a scene and color data of the scene are received from a capture device, such as capture device 101. The scene may include at least one player, as shown in FIG. 1.

In step 802, an image-enhancing color transform is applied to the color data of the player. For example, a histogram-based transform could correct white balance, such as disclosed at http://docs.gimp.org/en/gimp-layer-white-balance-.html. In another example, the histogram-based transform could correct intensity. Another example correction algorithm (for a color image operates on intensity after RGB data is converted to an intensity-based color space) is disclosed at http://fourier.eng.hmc.edu/e161/lectures/contrast_transform/node3.html. Additionally, a histogram equalization procedure could use an intensity-based color space, and then convert the result back to RGB. Other examples include local contrast enhancement using unsharp masking, and sharpening using convolution or unsharp mask. The image-enhancement transform could adjust, for example, white balance, intensity, gamma, contrast, color saturation, and color hue.

In step 803, an image of the player is output, using the color data and depth information. The image of the player is combined with video data. For example, as shown in FIG. 1, the live player is shown as part of the display on display device 103.

G. Depth Mask Smoothing

It may be possible to further improve the quality of a player mask generated from low-resolution depth information by performing smoothing on the player mask. Accordingly, an exemplary process for depth mask smoothing will be described with respect to FIG. 9 and FIGS. 10A to 10C.

Figure 9:
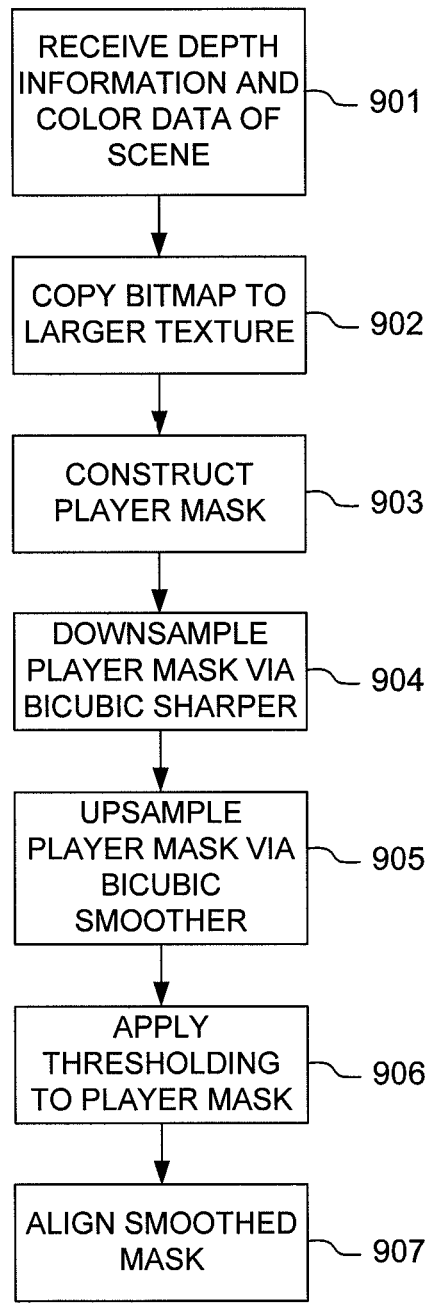
FIG. 9 is a flowchart diagram showing an exemplary procedure for depth mask edge smoothing.

Briefly, in FIG. 9, depth information of a scene and color data of the scene are received from a capture device. The scene includes a player and a background. A player mask is constructed from the depth information. Edge mask smoothing is performed on the player mask. An image of the player is output using the player mask, and the image of the player is combined with video data.

In more detail, in step 901, depth information of a scene and color data of the scene are received from a capture device. The scene includes a player and a background.

In step 902, the original bitmap (or texture) is copied to another larger texture and centered in the texture, with a suitable border to prevent artifacts (e.g., 16 pixels).

In step 903, a player mask is constructed from the depth information. In particular, the relatively low-resolution player mask is used to separate an area or areas likely to contain the player from other areas such as background.

In step 904, the player mask is downsampled to a lower resolution via, e.g., a bicubic sharper resampling filter, to generate a sharper contour of the mask.

In step 905, the player mask is upsampled using a smoothing filter, e.g., a bicubic smoother resampling filter.

In step 906, thresholding is applied to the player mask. At 128, for example, the mask appears to act like an interpolation of the edges. The threshold can be manipulated to make the smoothed version of the mask larger or smaller.

In step 907, the smoothed mask is aligned, if necessary. In particular, after scaling back up, the resulting mask may have shifted due to quantization. Accordingly, the smoothed mask can be aligned by finding the extents of the original mask (e.g., by a simple pixel search) and using the extent of the original mask to align the smoothed mask over the original blocky mask.

The above processes allow downsampling to the actual resolution of the data so that hole and block artifacts are effectively removed. Meanwhile, upsampling with a high-quality resampler (such as, but not limited to bicubic) will ordinarily result in smooth edges. The thresholding pulls in the boundary to match the original boundary.

In that regard, a large blur could be used in place of bicubic down/up sampling. Thus, the smoothing could apply a blur to generate the smoothed player mask. The blurring could be performed using a Gaussian blur, a Separable Gaussian blur, a box blur, or separable box blur, among others. Moreover, bicubic down/upsampling can be simulated using repeated bilinear filtering. In addition, a variety of filtered resamplers could be used, especially for downsampling, including Lanczos, Mitchell-Netravali, etc. (windowed sinc filters).

Figure 10A:
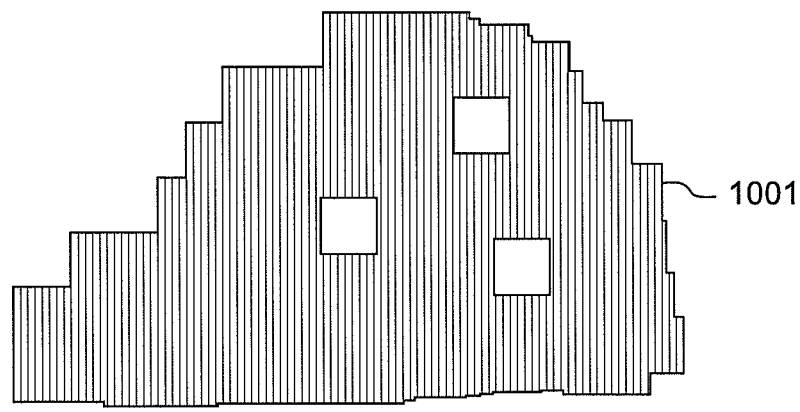
FIGS. 10A to 10C are representative views for explaining depth mask edge smoothing.
Figure 10B:
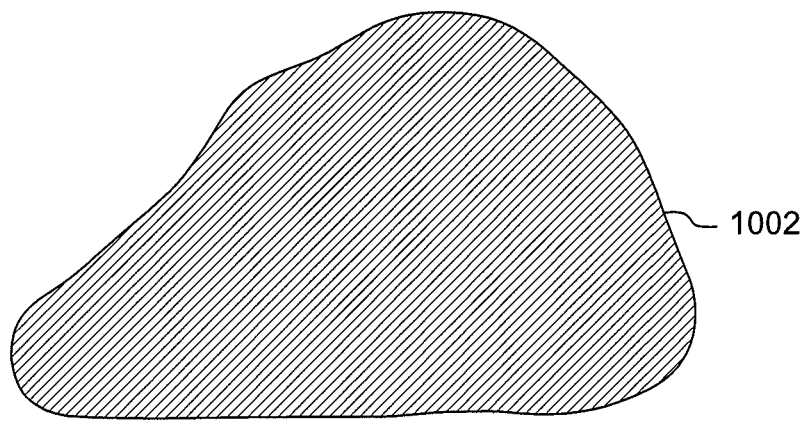
Figure 10C:
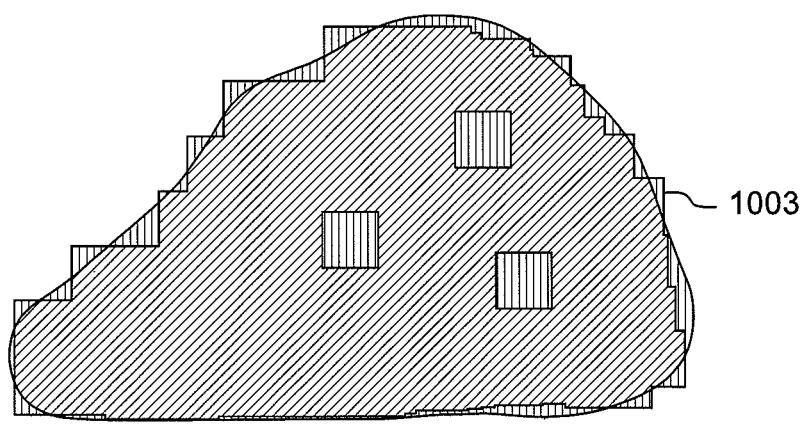

FIGS. 10A to 10C are representative views of depth mask edge smoothing. In particular, FIG. 10A depicts an example of a portion of a player mask 1001 generated from depth information alone, which, due in part to the low resolution of the depth information, may be blocky and include holes. FIG. 10B depicts the same mask portion after being downsampled to 16 pixels wide via a bicubic sharper resampling filter, upsampled back up via a bicubic smoother resampling filter, and thresholded to 128 to generate a smoothed mask 1002, at which point the smoothed mask 1002 appears to act like an interpolation of the edges of the mask. For comparison, FIG. 10C depicts an example image 1003 of the original blocky mask 1001 combined with the smoothed version 1002.

In some examples, the thresholding step could be removed. In such an example, the process would blur the image similar to a Gaussian/Box blur with a large kernel (which would ordinarily be expensive to compute). The blurring might improve the quality of the final color-matched mask.

Another possible step is to add a per-pixel power function for the blurred mask. This allows for ramping down the edge of the feathering after blurring, tightening the mask while keeping sufficient transparency to cleanly blend the edges.

According to the processes described above, it may be possible to improve the quality of the player mask at a relatively low computational cost.

H. Other Adjustments

In addition to the above processes, other changes can be made in the image processing pipeline to improve the output stream.

For example, it might be helpful to only erode in specific areas, for example only around the body, or possibly the head. Additionally, an unsharp mask can be used to increase sharpness and locally enhance contrast once necessary data (e.g., data to fill holes) has been acquired. Other sharpening technologies can build on blur technologies, such as an unsharp mask sharpening filter.

In some instances, the silhouette contour may be sensitive to flickering along the depth contours. Accordingly, as noted above, the silhouette can be accumulated over a small number of frames (e.g., in an accumulation buffer) to make a more temporally stable mask for color/intensity processing. In other instances, a high intensity halo in areas of high variability in the depth data could be used to detect unreliable depth contours. Depth information on a color could be chosen based on a statistical decision, e.g., choosing the highest confidence data. For example, high variance data could be treated as less stable. According to this process, it might be possible to reduce or remove invalid data and thereby reduce flashing or flickering, while reducing or avoiding "ghosting".

Moreover, using additional data such as color radiance and shadow map textures, it is ordinarily possible to improve color matching and lighting adjustment algorithms. Contrast filters and saturation filters can also be used to enhance the player image prior to output in the video stream. Moreover, color curve adjustments can be used to improve contrast and modify dynamic ranges before filtering, and then to modify dynamic ranges after filtering.

In still other embodiments, it might be helpful to use a relatively long term for updating the background buffer, so that noise in the foreground mask does not throw off the background model, or so that player pixels do not get integrated in the background. Additionally, a relatively conservative threshold could be used in terms of determining background pixels to further improve the background model.

In still other aspects, removing a cursor from the game display (if there is one) may increase available processing power for player masking.

Once the final mask is created, a Gaussian blur or other blur could be applied to the mask used as an alpha channel to provide feathered edges for a more pleasing final composition.

As mentioned above, a "step out-step in" process could be used to direct the user when to step into the range of the capture device, allowing time for the system to process the background for a period of time without the player interfering.

VI. Computer Readable Medium Implementation

The example embodiments described above such as, for example, the systems and procedures depicted in or discussed in connection with FIGS. 1 to 10C, or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nano-systems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

The invention claimed is:

1. A method for performing image processing based on depth information and color data of a scene, the method comprising:
    performing, by a processor, the steps of:
        receiving the depth information of the scene and the color data of the scene from a capture device, wherein the scene includes a player and a background;
        applying a noise reduction filter to the color data;
        applying an image enhancing color transform to the color data;
        generating a player mask from the depth information;
        blurring the edges of the player mask;
        constructing a background model of the scene by performing, for each pixel, the steps of:
            storing the position p of the pixel and color components of the pixel,
            initializing a model pixel at the same position p with a color component distribution,
            initializing a variable as an update weight,
            updating values of the model pixel according to a predetermined process based on the variable and the color components of the pixel, and
            determining the pixel to be a background pixel or a foreground pixel based on a predetermined rule, the color components of the pixel, and the updated values of the model pixel,
            wherein if the pixel is determined to be a background pixel, then the color data from the capture device is used to update the background model, and if the pixel is determined to be a foreground pixel, then the color data from the capture device is not used to update the background model; and
        outputting an image of the player using the color data and depth information, wherein the image of the player is combined with video data, and wherein the image of the player is composited with the video data using the blurred mask as an alpha channel.

2. The method according to claim 1, wherein the noise reduction filter is a hybrid median filter.

3. The method according to claim 1, wherein the noise reduction filter is a bilateral filter.

4. The method according to claim 1, further comprising interpolating between the color data and filtered color data resulting from applying the noise reduction filter, wherein the interpolation comprises the steps of:
    detecting edges in the scene using an edge detection filter, and storing the detected edges as an original edge image;
    blurring a copy of the edge image;
    interpolating between the original edge image and blurred edge image using the original edge image as a mask.

5. The method according to claim 4, wherein sharp edges are minimally blurred, non-edge areas are maximally blurred, and areas with intermediate sharpness are partially blurred.

6. The method according to claim 1, wherein:

r, g, b=the color components of the pixel, G(mr, sr), G(mg, sg), G(mb, sb)=the color component distribution of the model pixel, a=the variable as the update weight, the predetermined process by which the values of the model pixel are updated includes performing the following computations:

$$mr=a*r+(1-a)*mr$$

$$sr=a*(r-mr)+(1-a)$$

$$mg=a*g+(1-a)*mg$$

$$sg=a*(g-mg)+(1-a)*sg^2$$

$$mb=a*b+(1-a)*mb$$

$$sb=a*(b-mb)+(1-a)*sb^2, \text{ and}$$

the predetermined rule by which the pixel is determined to be a background pixel or a foreground pixel includes determining the pixel to be a background pixel if |r−mr|<2sr, |g−mg|<2sg, and |b−mb|<2sb, and determining the pixel to be a foreground pixel otherwise.

7. The method according to claim 6, wherein the background model of the scene is reset to an initial state if the background model is determined to be invalid.

8. The method according to claim 7, wherein the number of pixels in a foreground mask in each whole frame are calculated, and if the number changes past a threshold value, the background model is determined to be invalid and is reset to the initial state.

9. The method according to claim 7, wherein the number of pixels in a foreground mask in each whole frame are calculated, and if a threshold value of pixels in an area are marked as foreground while the depth information indicates that the same area is background, the background model is determined to be invalid and is reset to the initial state.

10. The method according to claim 1, wherein the blurring is performed using one of:

Gaussian blur,
separable Gaussian blur,
box blur,
separable box blur, and
filtered resampling, and wherein the compositing is performed using alpha blending.

11. The method according to claim 1, further comprising:

clearing a background buffer storing pixels for the background;

determining whether each pixel is a foreground pixel or a background pixel according to the depth information;

blurring the player mask for a predetermined period of time;

locating additional areas which are not part of the background according to the depth information and which are part of the moving player according to the color data; and filling in the additional areas using the color data.

12. The method according to claim 11, further comprising the steps of:

computing a frame histogram for each frame and a low-pass filtered mean of the frame histogram;

comparing the computed frame histogram against a prior histogram; and computing a histogram variance and a low-pass filtered variance, wherein if the histogram variance for R, G or B exceeds more than twice the low-pass filtered variance for R, G or B, the background buffer is re-cleared.

13. The method according to claim 11, wherein indicators are displayed to direct movement so that a portion of the background obscured by the player can be updated.

14. The method according to claim 1, further comprising:

performing a first detection of a player contour using the depth information; and performing a second detection of the player contour based on the first detection, wherein the second detection is based on computing a gradient in the color data followed by non-maxima suppression, and wherein the image of the player is output based on the player contour.

15. The method according to claim 14, wherein the second detection is performed using at least one of an active contours model, a graph cuts technique, or an intelligent scissors segmentation technique.

16. The method according to claim 1, wherein the image-enhancing transform includes performing at least one of a histogram-based transform, unsharp masking, and convolution, and wherein the image-enhancing transform adjusts at least one of white balance, intensity, gamma, contrast, color saturation, and color hue.

17. An apparatus for performing image processing based on depth information and color data of a scene, the apparatus comprising at least one processor, wherein the processor is configured to:

receive the depth information of the scene and the color data of the scene from a capture device, wherein the scene includes a player and a background;

apply a noise reduction filter to the color data;

apply an image enhancing color transform to the color data of the player;

generate a player mask from the depth information;

blur the edges of the player mask;

construct a background model of the scene by performing, for each pixel:

storing the position p of the pixel and color components of the pixel, initializing a model pixel at the same position p with a color component distribution, initializing a variable as an update weight, updating values of the model pixel according to a predetermined process based on the variable and the color components of the pixel, and determining the pixel to be a background pixel or a foreground pixel based on a predetermined rule, the color components of the pixel, and the updated values of the model pixel, wherein if the pixel is determined to be a background pixel, then the color data from the capture device is used to update the background model, and if the pixel is determined to be a foreground pixel, then the color data from the capture device is not used to update the background model; and output an image of the player using the color data and depth information, wherein the image of the player is combined with video data, wherein the image of the player is composited with the video data using the blurred mask as an alpha channel.

18. A non-transitory computer-readable medium having stored thereon sequences of instructions, the sequences of instructions including instructions, which, when executed by a processor, cause the processor to perform:

receiving depth information of a scene and color data of the scene from a capture device, wherein the scene includes a player and a background;
applying a noise reduction filter to the color data;
applying an image enhancing color transform to the color data of the player;
generating a player mask from the depth information;
blurring the edges of the player mask;
constructing a background model of the scene by performing, for each pixel, the steps of:
storing the position p of the pixel and color components of the pixel,
initializing a model pixel at the same position p with a color component distribution,
initializing a variable as an update weight,
updating values of the model pixel according to a predetermined process based on the variable and the color components of the pixel, and
determining the pixel to be a background pixel or a foreground pixel based on a predetermined rule, the color components of the pixel, and the updated values of the model pixel,
wherein if the pixel is determined to be a background pixel, then the color data from the capture device is used to update the background model, and if the pixel is determined to be a foreground pixel, then the color data from the capture device is not used to update the background model; and
outputting an image of the player using the color data and depth information, wherein the image of the player is combined with video data,
wherein the image of the player is composited with the video data using the blurred mask as an alpha channel.

19. A method for performing image processing based on depth information and color data of a scene, the method comprising:
performing, by a processor, the steps of:
receiving the depth information of the scene and the color data of the scene from a capture device, wherein the scene includes a player and a background;
constructing a background model of the scene by performing, for each pixel, the steps of:
storing the position p of the pixel and color components of the pixel,
initializing a model pixel at the same position p with a color component distribution,
initializing a variable as an update weight,
updating values of the model pixel according to a predetermined process based on the variable and the color components of the pixel, and
determining the pixel to be a background pixel or a foreground pixel based on a predetermined rule, the color components of the pixel, and the updated values of the model pixel,
wherein if the pixel is determined to be a background pixel, then the color data from the capture device is used to update the background model, and if the pixel is determined to be a foreground pixel, then the color data from the capture device is not used to update the background model;
constructing a player mask from the depth information;
performing edge mask smoothing on the player mask; and
outputting an image of the player using the player mask, wherein the image of the player is combined with video data.

20. The method according to claim 19, wherein the smoothing comprises the steps of:
copying a bitmap image of the scene to a larger texture;
downsampling the player mask to a lower resolution;
upsampling the player mask using a smoothing filter to generate a smoothed player mask;
applying thresholding to the smoothed player mask; and
aligning the smoothed player mask with the original player mask after locating the extent of the original player mask using a pixel search.

21. The method according to claim 20, wherein the downsampling is performed using a bicubic sharper filter, and wherein the upsampling is performed using a bicubic smoother filter.

22. The method according to claim 19, wherein the smoothing comprises the steps of:
copying a bitmap image of the scene to a larger texture;
applying a blur filter to generate a smoothed player mask;
applying thresholding to the smoothed player mask; and
aligning the smoothed player mask with the original player mask after locating the extent of the original player mask using a pixel search.

23. The method according to claim 22, wherein the blurring is performed using one of:
Gaussian blur,
separable Gaussian blur,
box blur,
separable box blur, and
filtered resampling.

* * * * *